(12) United States Patent
Bennett et al.

(10) Patent No.: US 7,366,616 B2
(45) Date of Patent: Apr. 29, 2008

(54) COMPUTER-BASED METHOD FOR WHILE-DRILLING MODELING AND VISUALIZATION OF LAYERED SUBTERRANEAN EARTH FORMATIONS

(75) Inventors: Nicholas Bennett, Hamden, CT (US); Richard T. Coates, Middlebury, CT (US); Alberto Malinverno, Blauvelt, NY (US); Dzevat Omeragic, Lexington, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 58 days.

(21) Appl. No.: 11/332,736

(22) Filed: Jan. 13, 2006

(65) Prior Publication Data

US 2007/0168133 A1    Jul. 19, 2007

(51) Int. Cl.
*G01V 3/20* (2006.01)
*G01V 3/38* (2006.01)

(52) U.S. Cl. .............................................. 702/9; 702/7
(58) Field of Classification Search .................... 702/6, 702/9, 7, 10
See application file for complete search history.

(56) References Cited

U.S. PATENT DOCUMENTS

| 5,461,562 | A | * | 10/1995 | Tabanou et al. | ............... | 702/11 |
| 5,966,672 | A | * | 10/1999 | Knupp | ......................... | 702/16 |
| 6,549,854 | B1 | | 4/2003 | Malinverno et al. | | |
| 6,594,584 | B1 | | 7/2003 | Omeragic et al. | | |
| 6,984,983 | B2 | * | 1/2006 | Tabanou | ..................... | 324/367 |

2004/0204859 A1    10/2004    Knobloch

OTHER PUBLICATIONS

Dahlquist, G. and Bjorck, A., Numerical Methods, Prentice-Hall, Inc. Englewood Cliffs, New Jersey, 1974, Section 7.5, pp. 307-311.
Li et al., "New Directional Electromagnetic Tool for Proactive Geosteering And Accurate Formation Evaluation While Drilling," SPWLA 46th Annual Logging Symposium, Jun. 26-29, 2005.

(Continued)

*Primary Examiner*—Donald E McElheny, Jr.
(74) *Attorney, Agent, or Firm*—Vancent P. Loccisano; Jody Lynn DeStefanis

(57) ABSTRACT

A computer-based method is provided for modeling and visualizing a property of a subterranean earth formation while drilling a borehole therethrough. The computer-based method gathers electromagnetic signals corresponding to a current measurement station location of a measurement-while-drilling tool, and generates a multilayer model corresponding to such electromagnetic signals. A histogram characterizing uncertainty of the multilayer model is used to generate a set of color hue values which represent predictions of the formation property for depth values above/below the tool, and a corresponding set of saturation values (which represent uncertainties for these predictions). A curtain plot is generated and displayed. The curtain plot employs colors to visualize formation property predictions for depth values above/below the tool over successive measurement station locations. A new column of the curtain plot is generated for the current measurement station location. The color values of the new column are based upon the set of color hue values and the set of saturation values derived from the histogram. The saturation levels of the new column represent uncertainties for the corresponding predictions.

25 Claims, 10 Drawing Sheets
(5 of 10 Drawing Sheet(s) Filed in Color)

OTHER PUBLICATIONS

Oldenburg, et al., "Estimating depth of investigation in DC resistivity and IP Surveys," Geophysics, Soc. of Expl. Geophys., vol. 64, No. 2, pp. 403-416, 1999.

Seydoux et al., "A Deep Resistivity Logging-While-Drilling Device for Proactive Geosteering," The Leading Edge, Jun. 2004, pp. 581-586, 2004.

Tarantola et al., "Generalized Nonlinear Inverse Problems Solved using the Least Squares Criterion," Reviews of Geophysics and Space Physics, vol. 20, No. 2, pp. 219-232, 1982.

Yang et al., "Bed-Boundary Effect Removal to Aid Formation Resistivity Interpretation from LWD Propagation Measurements at All Dip Angles", SPWLA 46th Annual Logging Symposium, New Orleans, Jun. 26-29, 2005.

Welch et al., "An Introduction to the Kalman Filter," Technical Report TR 95-041, Department of Computer Science, University of North Carolina at Chapel Hill, 2002, available at http://www.cs.unc.edu/welch.

Sen et al. "Global optimization methods in Geophysical Inversion," Elsevier, Amsterdam, 1995, ppl. 83-86.

Press et al. "Numerical Recipes in C: The Art of Scientific Computing," Cambridge University Press, New York, 2nd Edition, 1992, Section 7.3.

Malinverno et al., "Bayesian Inversion of DC electrical measurements with uncertainties for reservoir monitoring", Inverse Problems, vol. 16, pp. 1343-1356, 2000.

Malinverno et al. "Expanded uncertainty quantification in inverse problems: Hierarchical Bayes and Empirical Bayes," Geophys. Soc. of Expl. Geophys., vol. 69, No. 4 pp. 1005-1016, 2004.

Malinverno, A., "Parsimonious Bayesian Markov chain Monte Carlo inversion in a nonlinear geophysical problem", Geophys. J. Int., vol. 151, pp. 675-688, 2002.

Malinverno, A., "A Bayesian criterion for simplicity in inverse problem parametrization", Geophys. J. Int., vol. 140, pp. 267-285, 2000.

Tarantola, A., "Inverse Problem Theory and Methods for Model Parameter Estimation", SIAM 2005, pp. 78-80.

UK Intellectual Property Office, Patents Act 1977: Search Report Under Section 17 for Application No. GB0700589.5 dated Apr. 24, 2007.

* cited by examiner

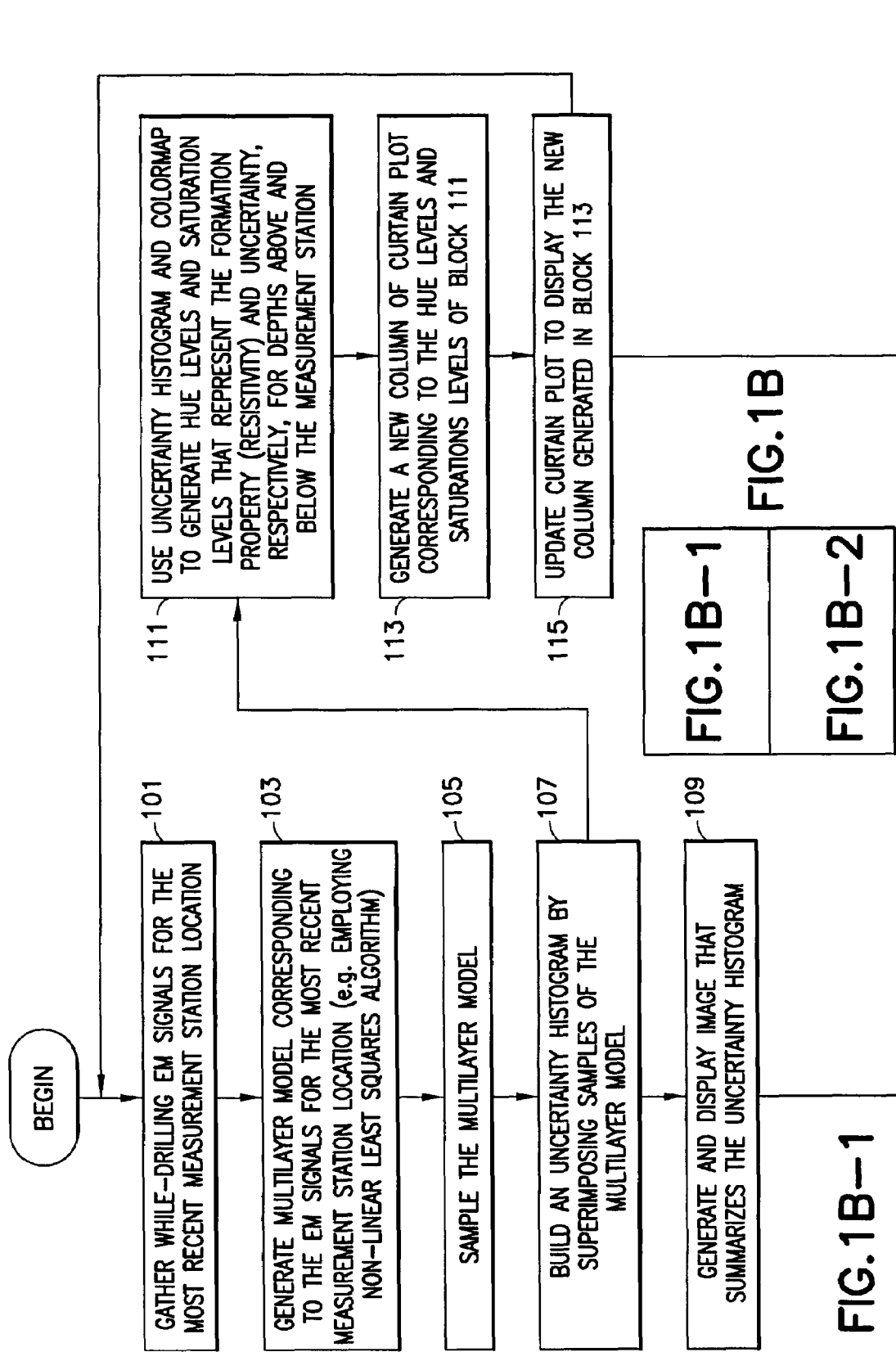

COMPUTER-BASED METHOD FOR WHILE-DRILLING MODELING AND VISUALIZATION OF LAYERED SUBTERRANEAN EARTH FORMATIONS

BACKGROUND OF THE INVENTION

1. Field of the Invention

This invention relates generally to the field of measurement-while-drilling tools. More particularly, this invention relates to methods for processing electromagnetic signals from a measurement-while-drilling tool to model and visualize layered subterranean earth formations surrounding the tool.

2. State of the Art

Wellbores drilled through earth formations to extract fluids such as petroleum are frequently drilled along a substantially horizontal trajectory in a reservoir in order to increase the drainage area in the reservoir. Because such reservoirs are frequently located in layered subterranean earth formations, the position of the substantially horizontal wellbore relative to the boundaries of the layers in the earth formation often has a material effect on the productivity of such wellbores.

Geosteering solutions have been developed that utilize a measurement-while-drilling tool to provide for real-time prediction and visualization of the layer structure of the subterranean earth formation surrounding the tool. Such real-time visualization allows operators to control the direction of the well bore drilling operations in order to place (i.e., land) the wellbore in a particular section of a reservoir to minimize gas or water breakthrough and maximize economic production therefrom.

Electromagnetic (EM) induction and propagation-style logging tools are well suited for these geosteering applications because of their relatively large lateral depth of investigation into the surrounding formation. Directional EM measurement-while-drilling tools have recently been proposed; see Seydoux et al., "A Deep-Resistivity Logging-While-Drilling Device for Proactive Geosteering," The Leading Edge, Vol. 23, no. 6, pp 581-586, 2004; Li et. al., "New Directional Electromagnetic Tool For Proactive Geosteering And Accurate Formation Evaluation While Drilling," 46th SPWLA Annual Symposium, Jun. 26-29, 2005; and Yang et. al., "Bed-Boundary Effect Removal to Aid Formation Resistivity Interpretation from LWD Propagation Measurements at All Dip Angles", SPWLA 46th Annual Logging Symposium, New Orleans, Jun. 26-29, 2005, all incorporated by reference herein in their entireties. Such directional EM measurement-while-drilling tools enable distinguishing the resistive properties of the formation above and below the tool location while drilling substantially horizontal and deviated wells. These measurement-while-drilling tools routinely carry both relatively short coil spacings sensitive to the EM properties of the formation layers near the logging tool location as well as longer coil spacings that are also sensitive to the resistive properties of formation layers farther away from the tool location.

When drilling through some earth formations, the directional EM measurement-while-drilling tools are sensitive to formation properties quite distant from the instrument location, while in other formations, the tools are only sensitive to more local formation properties near the instrument.

Current geosteering solutions provide for modeling and visualization of the formation properties near the tool locations (see commonly owned, U.S. Pat. No. 6,594,584, entitled "Method for Calculating a Distance Between a Well Logging Instrument and a Formation Boundary by Inversion Processing Measurements from the Logging Instrument", incorporated herein be reference in its entirety). Current geosteering solutions, however, fail to provide an effective mechanism for modeling and visualizing formation properties far away from the tool locations. Thus, in some earth formations, the formation properties and boundary locations far away from the tool location are only partially determined from the measurements, and it is difficult to locate (e.g., land) the wellbore in a desired section of the reservoir that maximizes economic production without quantifying and effectively displaying this partial information.

Current methods for displaying locations where inverted resistivity is unreliable through the use of color saturation has been published previously by Oldenburg, et al., "Estimating depth of investigation in DC resistivity and IP Surveys," Geophysics Soc. of Expl. Geophys., Vol. 64, pp 403-416, 1999, incorporated by reference herein in its entirety. These methods (a) do not use uncertainty but a "depth of investigation" (DOI) index to indicate where resistivity is unconstrained by the data and (b) are applied to surface resistivity measurements. Accounting for uncertainty displaying the partial information available from the measurements concerning formation properties far from the tool locations.

Moreover, in some instances, the earth formation has been surveyed by other means (e.g., a 3D seismic survey) prior to drilling. In such instances, it would be beneficial to enable a comparison of the formation properties visualized by the geosteering solution to the formation properties of the prior survey to allow for more informed decision-making regarding the directional control over the drilling operations. Because the current geosteering solutions fail to provide an effective mechanism for modeling and visualizing formation properties far away from the tool locations, it is difficult to confirm with certainty correspondence between the current drilling location and the prior survey. This makes it difficult to effectively integrate the information of the prior survey with the real-time information generated by geosteering and thus can limit the drilling control decision-making process.

SUMMARY OF THE INVENTION

It is therefore an object of the invention to provide a method for while-drilling modeling and visualization of the formation properties at locations near the tool as well as locations far away from the tool.

It is another object of the invention to provide a method for while-drilling modeling and visualization of the uncertainty of the formation property predictions at the locations near the tool as well as locations far away from the tool.

It is a further object of the invention to provide a method for while-drilling modeling and visualization of formation property predictions over successive measurement station locations in a manner that predicts the spatial distribution of the formation properties as well as uncertainties corresponding thereto for the next measurement station location based upon the model for the current measurement station location.

In accord with these objects, which will be discussed in detail below, a computer-based method is provided for modeling and visualizing a property of a subterranean earth formation while drilling a borehole therethrough. The computer-based method gathers a plurality of electromagnetic signals corresponding to a current measurement station location of a measurement-while-drilling tool. A multilayer model is generated that corresponds to the plurality of electromagnetic signals. A histogram characterizing uncertainty of the multilayer model over depth values above and below the measurement-while-drilling tool is generated by superimposing samples of the multilayer model. A set of color hue values and corresponding set of saturation values are generated based upon the histogram. The set of color hue values represent predictions of the formation property (e.g., resistivity) for depth values above and below the measurement-while-drilling tool. The set of saturation values represent uncertainties for the predictions from which the corresponding color hue values are derived. Preferably, the color hue values and corresponding saturation values are derived from summary information of the histogram (e.g., a 50% contour curve and a width curve). Such summary information is used to index into a colormap, which converts the summary information into corresponding color hue values and saturation values. A curtain plot is generated and displayed. The columns of the curtain plot employ colors to visualize predictions of the formation property for depth values above and below the measurement-while-drilling tool over successive measurement station locations. A new column of the curtain plot is generated for the current measurement station location. The color values of the new column are based upon the set of color hue values and the set of saturation values derived from the histogram. The saturation levels of the color values of the new column represent uncertainties for the predictions from which the corresponding color values are derived.

It will be appreciated that this methodology allows for an improved evaluation and easier interpretation of the prediction uncertainties for the user, particularly when characterizing formation properties far away from the measurement station location of the measurement-while-drilling tool.

Additional objects and advantages of the invention will become apparent to those skilled in the art upon reference to the detailed description taken in conjunction with the provided figures.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF THE PREFERRED EMBODIMENTS

Figure 1A:
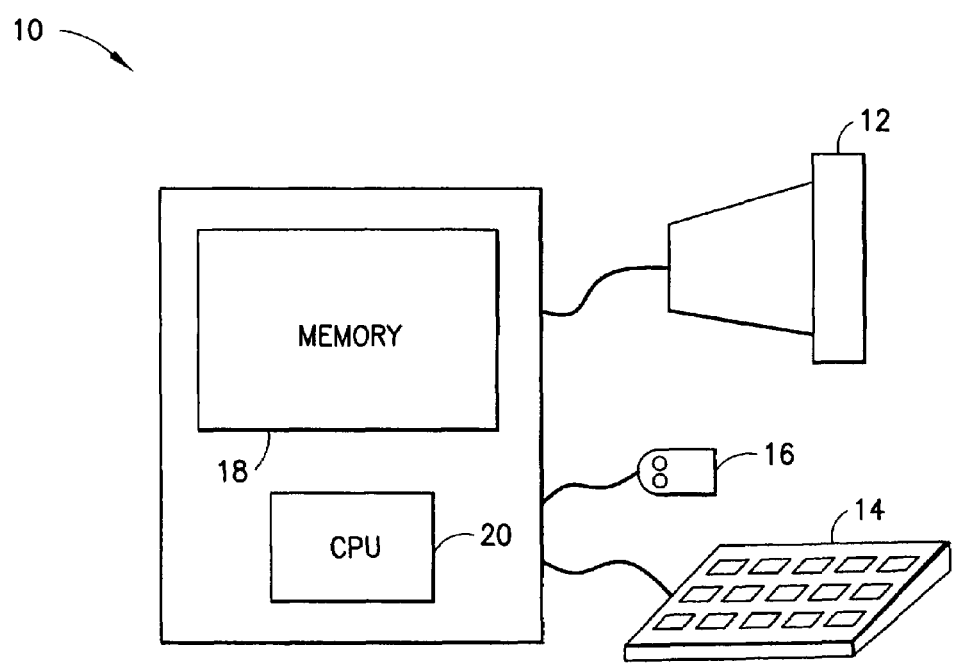
FIG. 1A is a block diagram of a computer processing system that embodies the methodology of the present invention.

FIG. 1A is a functional block diagram of a general purpose computer system 10 that embodies the present invention. The computer system 10 may include a work station (or high performance personal computer) that performs the relevant computations and visualizations as discussed below. For example, the computer system 10 may include a display device 12 and user input devices such as a keyboard 14 and mouse 16. The computer system 10 also includes memory 18 (e.g., persistent memory such as a magnetic hard disk drive as well as non-persistent memory such as one or more DRAM modules) that stores software application(s) that are executed on a processor 20 to perform the relevant computations and visualizations as discussed below. The memory 18 and processor 20 may be realized by a uniprocessor-type computer system, a multiprocessor-type computer system, or a cluster of computer processing systems as are well known in the computer art. The software applications stored in the memory 18 include a programmed sequence of instructions and data, which are typically stored on one or more optical disks and loaded into the memory 18 by an optical disk drive (not shown) for persistent storage therein. Alternatively, such software applications can be loaded into the memory 18 over a network connection (e.g., an Internet connection) or other suitable means for persistent storage therein.

Figures 1, 1B, 2:
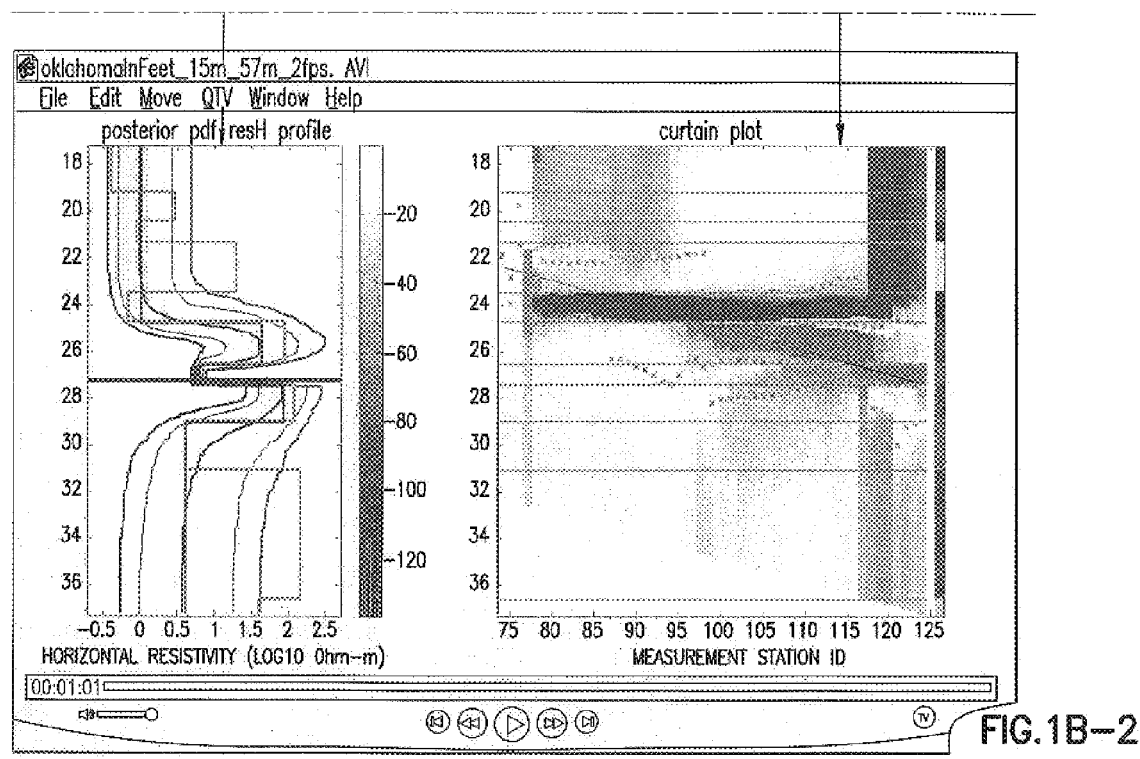
FIG. 1B is a flow chart illustrating the workflow of the computer-based methodology for while-drilling modeling and visualizing the properties of a subterranean earth formation in accordance with the present invention.
FIG. 2 is a schematic illustration of the exemplary model in accordance with the present invention, including layer thickness parameters, horizontal resistivity layer properties, and the relative formation dip parameter $\alpha$.
Figure 2:
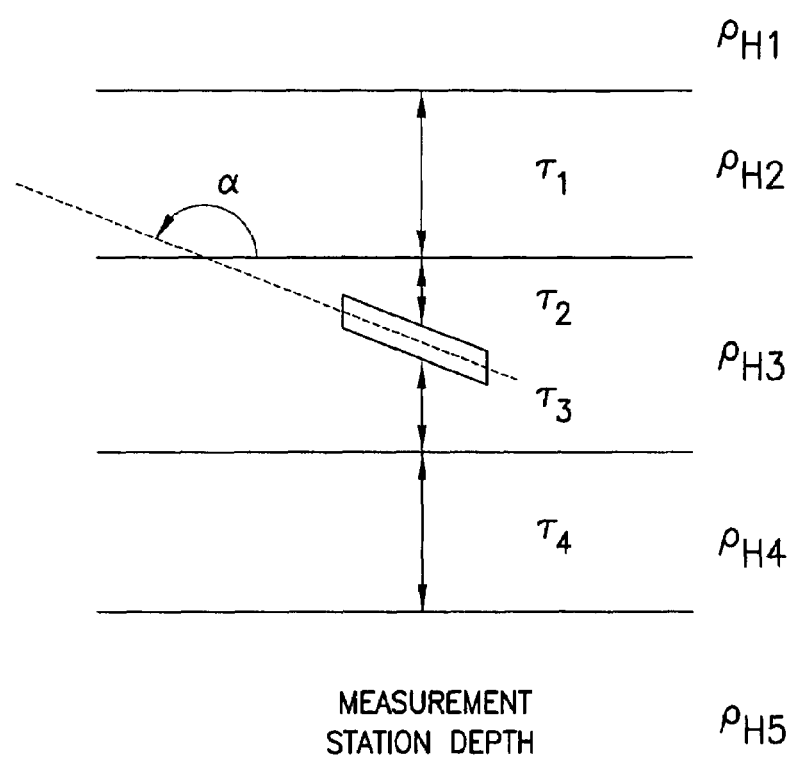

FIG. 1B illustrates a workflow that embodies a computer-based methodology that utilizes electromagnetic (EM) signals from a measurement-while-drilling tool to generate real-time predictions and visualizations of at least one subterranean earth formation property (e.g. resistivity) with quantified uncertainties. The real-time predictions and visualizations provide information regarding the formation properties near the tool locations as well as information regarding the formation properties far away from the tool locations. Such real-time information and visualizations are advantageous in geosteering applications because they allow for location of the wellbore in desired sections of the reservoir that maximize economic production therefrom.

The methodology begins in step 101 by gathering the electromagnetic (EM) signals obtained from a measurement-while-drilling tool at its most recent measurement station. In block 103, a multilayer model is generated that is in agreement with the electromagnetic (EM) signals for the most recent measurement station. In block 105, the model is sampled to obtain a collection of layered models that are approximately consistent with the electromagnetic (EM) signals for the most recent measurement station. In the preferred embodiment, the multilayer model is derived and sampled from a non-linear least squares algorithm as described below. In block 107, the model samples are superimposed upon one another to build a histogram that characterizes the uncertainty in at least one predicted formation property (e.g., resistivity) at locations above and below the measurement station. In block 109, an image that summarizes the histogram is generated and displayed as part of a display window (e.g., the left pane of the display window of FIGS. 3A or 3B). In block 111, a colormap is employed to convert the formation property and uncertainty information represented by the histogram to hue levels and saturation levels that represent at least one predicted formation property and corresponding uncertainty for locations above and below the measurement station. In block 113, the hue levels and saturation levels generated in block 111 are used to generate a new column of a curtain plot. In block 115, the new column of the curtain plot is displayed as part of a display window (e.g., a new right pane of the display window of FIGS. 3A or 3B). The operations then return back to block 101 to continue the operations for the while-drilling measurements for the next measurement station.

A fundamental component of the invention is a probability density function (PDF) that describes a multilayered model of formation properties at each measurement station or segment of measurement stations along the trajectory of the wellbore. This multilayered model is illustrated in FIG. 2. The parameters of the multilayered model m consist of:
  a. horizontal and vertical resistivity ($\rho$) of the layers;
  b. vertical depths/thicknesses ($\tau$) of the layer boundaries; and
  c. the relative dip ($\alpha$) of the formation with respect to the axis of the measurement device.

The number of layers in the model can be fixed by the user or the software can optimize the number of layers for the model at each measurement station as described below in more detail. In the examples presented herein, the model employs 5 layers and thus extends far away from the tool locations as will be evident from the description below.

The parameters of the multilayered model are determined on the basis of electromagnetic measurements acquired at the current measurement station (or possibly from a most recent segment of measurement stations). The electromagnetic measurements consist of the amplitudes and phases of electromagnetic measurement signals recorded using a set of receivers and transmitters with various operating frequencies and coil spacings. These measurements are denoted $d^{Obs}$. In the preferred embodiment, the measurements $d^{Obs}$ are obtained in real-time from a directional propagation-style measurement-while-drilling tool which is capable of distinguishing the formation properties above and below the tool location as described above.

The fundamental PDF of interest is the a posteriori PDF of the uncertain model parameters conditional on the measurements $d^{Obs}$. This PDF can be written using Bayes' rule.

$$f(m|d^{Obs}) \propto f(m) f(d^{Obs}|m) \quad (1)$$

where the prior PDF $f(m)$ is defined on the basis of what is known about m independent of the measurement data $d^{Obs}$ and typically describes physically reasonable bounds for the model parameters.

The likelihood function $f(d^{Obs}|m)$ measures how probable are the observed data values for a given value of the parameters of the multilayered model m. Many methods for computing this posterior distribution are well known in the prior art. The preferred implementation of the invention uses the nonlinear least squares algorithm as described below to obtain a posterior mean $\hat{m}$ and covariance matrix $\hat{C}$ that can be used to define a normal distribution $N(\hat{m},\hat{C})$ that approximates the posterior distribution $f(m|d^{Obs})$. Additional methods can be utilized when the nonlinear least squares algorithm fails to converge. Such additional methods include a Markov Chain Monte Carlo sampling method as described below.

By sampling from this normal distribution $N(\hat{m},\hat{C})$ (block 105), one can obtain a collection of layered models that are approximately consistent with the measurements $d^{Obs}$. By superimposing a large number of these samples (block 107), an uncertainty profile of the predicted formation resistivity above and below the measurement station is generated. In general, near the measurement station in vertical depth, many of the resistivity profiles will be relatively similar, and there will be small uncertainty in the uncertainty profile image. Farther away from the measurement station in vertical depth, the measurements typically provide only vague constraints, and there is large variation in the layered resistivity models. In these far away regions, the uncertainty in the resistivity profiles will be large. This variability of the uncertainty in the resistivity profiles depends on the true resistivities of the formation as well as the spacings, frequencies, and other characteristics of the measurement device. In the preferred embodiment, the uncertainty profile is a set of contour curves (e.g., 5%, 25%, 50%, 75%, 95% contours) of a histogram of horizontal resistivity predictions that are sampled from the multilayer model. Images of such uncertainty profiles for two exemplary data sets are displayed in the left panels of the display windows of FIGS. 3A and 3B, respectively.

Figure 3A:
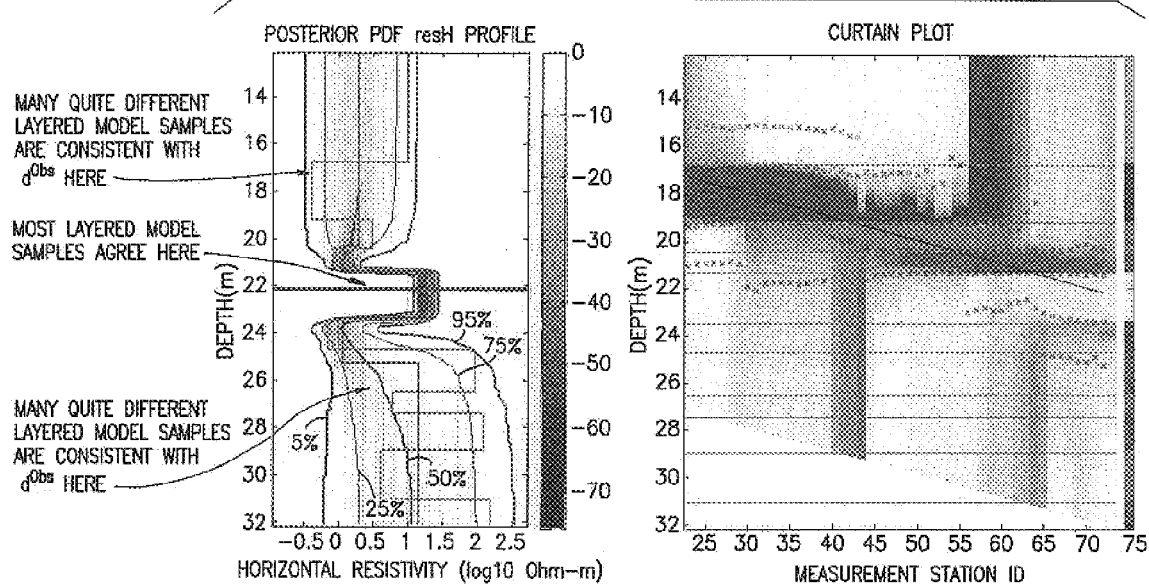
FIGS. 3A and 3B illustrate exemplary display windows generated by the while-drilling modeling and visualization workflow of FIG. 1B.

Note that left panel of the display window of FIG. 3A shows an uncertainty profile image where most of the layered models have a relatively similar profile near the depth of the measurement station (indicated by the horizontal magenta line). However, there is a relatively large variation in the description of the shoulder beds at depths far away from the measurement station. The measurements primarily constrain the thickness and resistivities of the layer containing the measurement device and the resistivities of the layers above and below the measurement device, while only vague information is available about the shoulder bed thicknesses. This large variation in the formation resistivity further away from the measurement device is essentially the uncertainty in the prior distribution, so that this posterior uncertainty profile image shows where the measurements constrain the formation resistivity relative to the prior distribution.

Figure 3B:
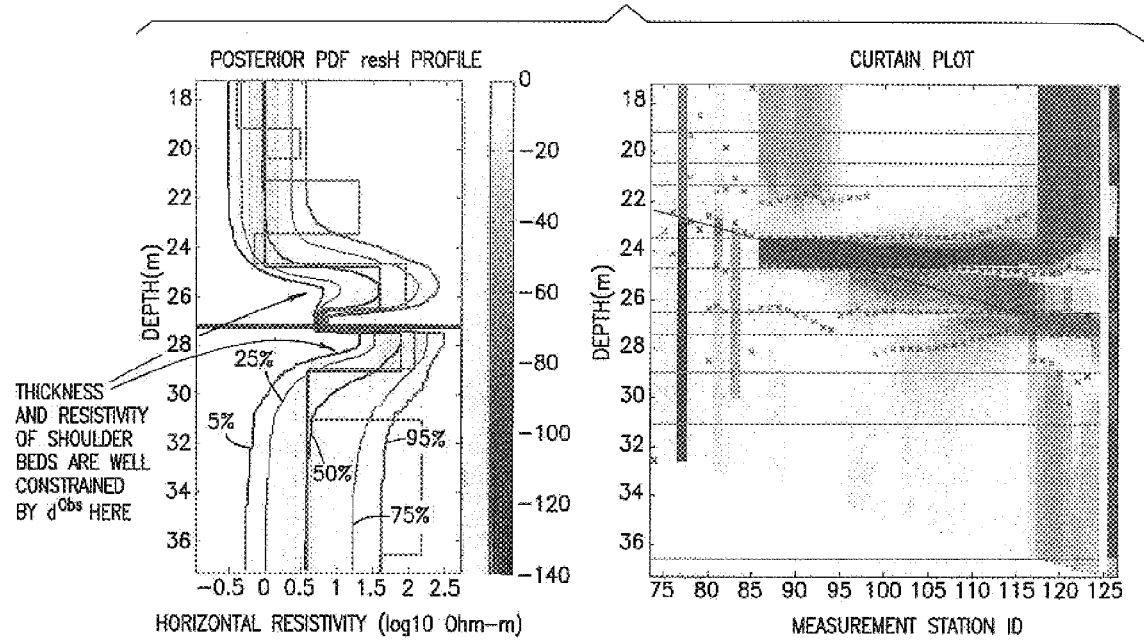

In contrast, the left panel of the display window of FIG. 3B shows an uncertainty profile where many of the layered models have shoulder beds whose thickness and resistivities are well constrained by the measurements. In other words, there is a relatively small variation in the description of the shoulder beds at depths far away from the measurement station.

Note that even though a five layer model is used in both FIGS. 3A and 3B, the histograms of the sampled layered models from the posterior distribution clearly reveal the depth of investigation and resolution of the measurement device for the two respective data sets.

The uncertainty profile for the predicted formation resistivity above and below the measurement station can be summarized and such summary information included as the last column of a specially constructed curtain plot (blocks 111-115). The curtain plot summarizes both the predicted formation resistivity and the uncertainty corresponding thereto for all available measurement stations. In the preferred embodiment of the invention, the new column for the curtain plot is constructed by first extracting the 50% contour curve and a width curve from the uncertainty profile. The width curve is defined as half the difference between the 95 and 5 percentile curves of the uncertainty profile. The extracted 50% contour curve and the width curve are digitized into two vectors whose elements correspond to vertical depth values. A colormap is used to convert the elements of the two vectors into a set of corresponding hue levels and saturation levels (block 111). The color values for a new column of the curtain plot is generated using these hue levels and saturation levels (block 113), and the new column is added to the curtain plot display (block 115). Note that the hue of the curtain plot display conveys localized resistivity information while the saturation level of the curtain plot display conveys uncertainty of the corresponding localized resistivity information. In this manner, the saturation levels of the colors in the curtain plot provide information as the uncertainty of the formation resistivity predictions whereby formation resistivity predictions with higher certainty have higher saturation levels as compared to those for formation resistivity predictions with lower certainty.

Figure 4:
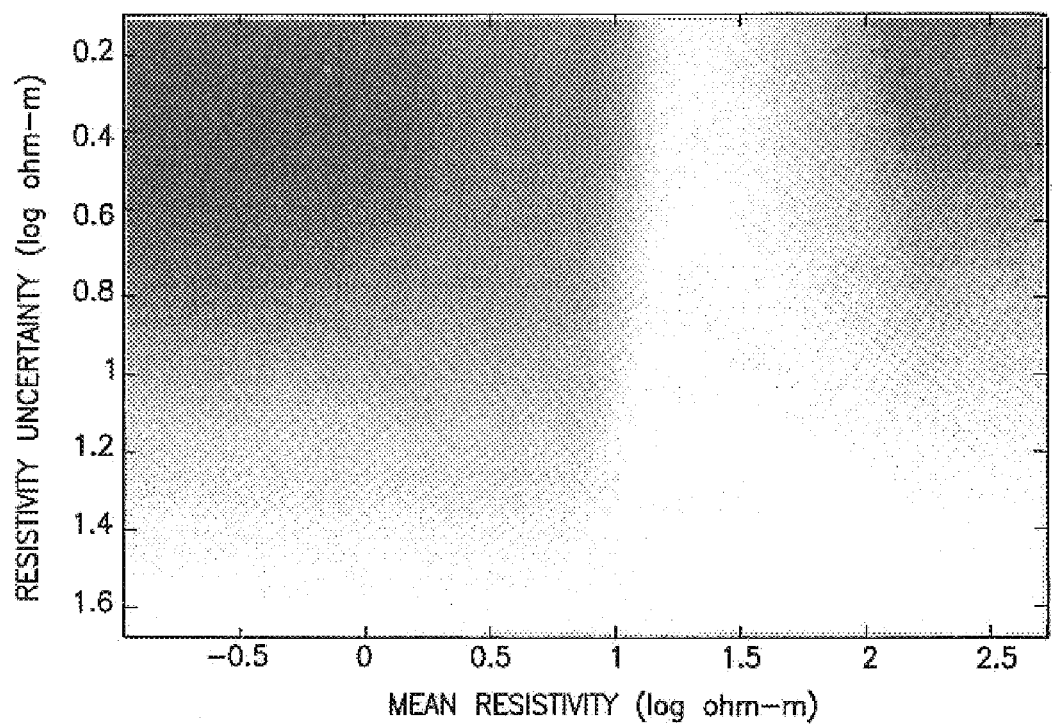
FIG. 4 is an image of an exemplary colormap that is used as part of the workflow of FIG. 1B to convert uncertainty profile information into a new column that is added to the curtain plot display.
Figure 5:
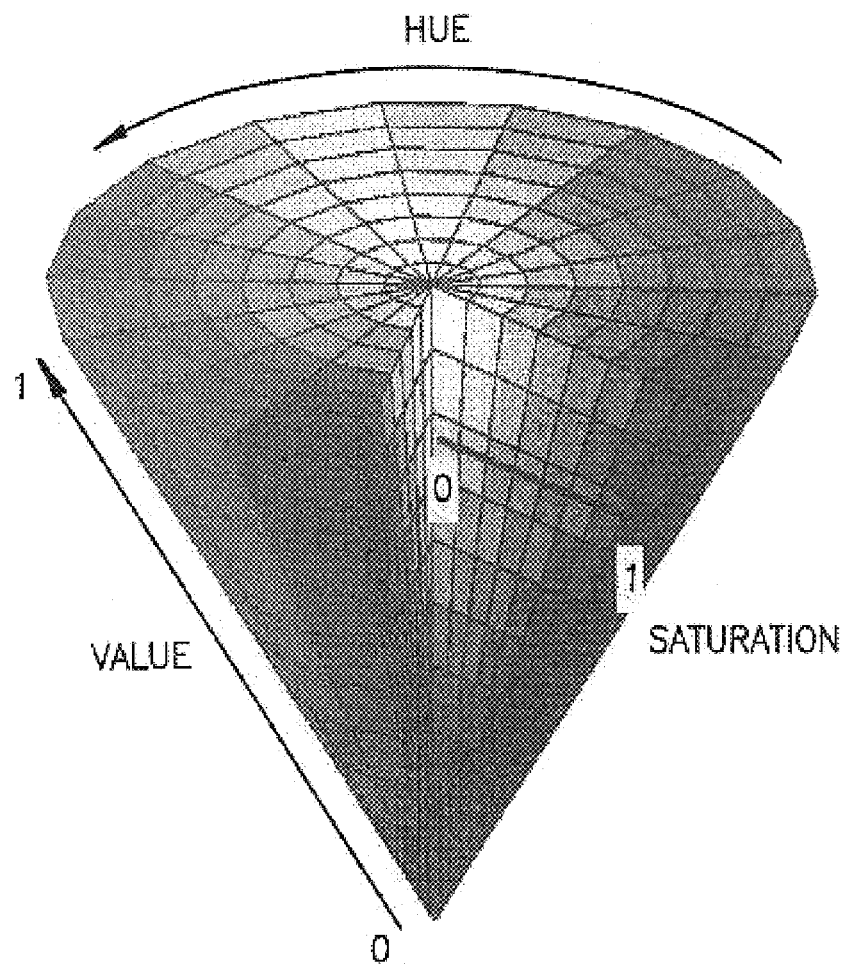
FIG. 5 is a pictorial illustration of the HSV color space.

The color map is a two dimensional array wherein each entry of the array stores data that represents a specific hue and a specific saturation. In the preferred embodiment, each entry of the array stores a 3-tuple in accordance with the well known HSV color space consisting of a hue value, a saturation value, and brightness value (FIG. 5). These three values specify a particular hue and a particular saturation. Other color spaces, such an RGB color space, can be used as well. The entries of the colormap are arranged such that hues specified by the entries are constant for a given column of the array and change over a given row of the array. Similarly, the saturation levels specified by the entries of the array are constant for a given row and change over a given column of the array. An exemplary color map is shown in FIG. 4. For a given true depth value, the value of the 50% contour curve (which corresponds to the mean predicted horizontal resistivity) determines a column index (hue) into the colormap, while the value of the width contour at the same depth determines the row index (saturation) in the colormap. The column and row index pair point to an entry of the colormap that specifies a particular hue and a particular saturation. In this manner, the hue of the entry corresponds to the mean predicted horizontal resistivity of the uncertainty profile and the saturation of the entry corresponds to the width of the uncertainty profile. The color values specified by the entry are used at the given true depth position in the last column of the curtain plot. The effect of the colormap encoding is to produce a column on the curtain plot image where the more saturated colors describe where the formation resistivities are better determined (higher certainty) and where the more washed out colors (less saturated colors) show where the formation resistivity is less well constrained by the measurements (lower certainty).

Note that the upper bound for the uncertainty axis of the colormap (the vertical axis) is determined from the prior distribution, so that when the measurements constrain the resistivity relative to the prior, the saturation of the assigned color is higher. This allows the visualization of the uncertainty to be relatively free of the effects of the choice of prior distribution.

The curtain plot provides a practical means for improved geosteering decisions and formation evaluation while-drilling by indicating the formation resistivity values above and below the depth of the measurement station and by characterizing the uncertainty of those resistivity predictions.

In the preferred implementation of the invention, the layered model of resistivity is parameterized using layer thicknesses (instead of the true vertical depths) of the layer boundaries. The nonlinear least squares algorithm is typically more stable with this choice of model parameterization. Also, the initial guess for nonlinear least squares iterative procedure is typically given by the posterior mean computed at the previous measurement station. This operation is essentially an application of the Kalman filter and advantageously provides an efficient and stable means of converting the posterior model's PDF at one measurement station to the next.

Model Parameterization

In the preferred embodiment of the present invention, a model of formation resistivity is parameterized with n layers as depicted in FIG. 2 as follows. First, the logarithm of the horizontal resistivities are parameterized by:

$$m_H = \begin{pmatrix} \log\rho_{H,1} \\ \log\rho_{H,2} \\ \vdots \\ \log\rho_{H,n} \end{pmatrix} \quad (2)$$

Parameterizing the logarithm of the horizontal resistivities ensures that these quantities are always positive.

Next, the vertical resistivities of the layers are parameterized using the logarithm of the ratio of vertical to horizontal resistivity as follows:

$$m_V = \begin{pmatrix} \log\left(\frac{\rho_{V,1}}{\rho_{H,1}} - 1\right) \\ \vdots \\ \vdots \\ \log\left(\frac{\rho_{V,n}}{\rho_{H,n}} - 1\right) \end{pmatrix} \quad (3)$$

Using this parameterization ensures that the ratio of vertical resistivity to horizontal resistivity (a ratio called anisotropy) is greater than 1 and thus makes the modeling results more physically realistic. An alternative parameterization for vertical resistivity can also be used which uses the same anisotropy ratio, a, for each layer.

$$m_a = \log(a-1) \quad (4)$$

In this case the vertical resistivities of the model's layers are modeled as $$\rho_v = (\exp(m_a)+1)\exp(m_H) \quad (5)$$

so that again vertical resistivity is bounded below by horizontal resistivity. Using the anisotropy ratio reduces the model size and can make the Monte Carlo sampling procedure more efficient.

Next, the layer positions are parameterized relative to the true vertical depth of the measurement device, tvd(l), where l is the index of the current measurement station.

$$m_\tau = \begin{pmatrix} \log(\tau_1) \\ \vdots \\ \log(\tau_{(n-1)/2}) \\ \log(\tau_{(n-1)/2+1}) \\ \vdots \\ \log(\tau_{n-1}) \end{pmatrix} \quad (6)$$

Here $\tau_k$ is the thickness of the $k^{th}$ layer, except for the terms $\tau_{(n-1)/2}$ and $\tau_{(n-1)/2+1}$ which describe the distance between the measurement device and the two inner layer boundaries.

The model parameterization when using the nonlinear least squares algorithm is then described by $$m = \begin{pmatrix} m_H \\ m_V \\ m_\tau \\ \alpha \end{pmatrix} \quad (7)$$

where α is the relative dip between the axis of the tool and the local formation layering.

Nonlinear Least Squares Algorithm

The nonlinear least squares algorithm is an iterative method that produces a sequence of model vectors $\hat{m}_k$ that converge to the posterior mean $\hat{m}$ of the probability density function (PDF) $f(m|d^{Obs})$. The nonlinear least squares algorithm is described in detail in Tarantola et al., "Generalized Nonlinear Inverse Problems Solved using the Least Squares Criterion," Reviews of Geophysics and Space Physics, Vol. 20, No. 2, pp. 219-232, 1982, herein incorporated by reference in its entirety. The non-linear least squares method includes:

(1) a method for computing the predicted response $d_k^{Pred}$ of the measurement device for the sequence of model vectors $\hat{m}_k$, wherein $d_k^{Pred} = g(\hat{m}_k)$; the predicted response $d_k^{Pred}$ is computed utilizing a forward modeling methodology on the spatial distribution of the electric and magnetic fields that are induced by the transmitters of the measurement device; in the preferred embodiment, such forward modeling is based on the Fourier-Hankel transform for an anisotropic layered medium; yet, other forward modeling methodologies can be used as well;

(2) a method for computing the sensitivities of the measurement response with respect to changes in the given layered model m, which is given by the Jacobian matrix of partial derivatives $$G_k = \left. \frac{\partial g}{\partial m} \right|_{m=\hat{m}_k}.$$

Preferably, a finite-difference approximation is used to compute the sensitivity matrix $G_k$ as described in Bjorck et al., "Numerical Methods", Prentice-Hall, Inc, Englewood Cliffs, N.J., 1974;

(3) the specification of a prior distribution function $f(m)$ in Equation 1 above; and (4) an estimate of the measurement errors in the layered model m (e.g., $d^{Obs} - g(m)$).

The prior distribution function $f(m)$ is specified based on what is known about the layered model m independent of the measurement data $d^{Obs}$ and typically describes physically reasonable bounds for the model parameters. Preferably, the prior distribution function $f(m)$ is specified as a normal random variable $N(\overline{m}, \overline{C})$ where $\overline{m}$ is the prior mean vector and $\overline{C}$ is the prior covariance matrix as follows.

First, the entries of the prior mean vector $\overline{m}$ that pertain to the horizontal resistivities of the layered model are defined as follows:

$$\overline{m}_H = \begin{pmatrix} \log \overline{\rho}_{H,1} \\ \log \overline{\rho}_{H,2} \\ \vdots \\ \log \overline{\rho}_{H,n} \end{pmatrix} \quad (8)$$

Typical settings for the prior mean horizontal resistivity is $\overline{\rho}_{H,k} = 10$ ohm-meters for all layers k.

Next, the entries of the prior mean vector $\overline{m}$ that pertain to the vertical resistivities of the layered model are defined as follows:

$$\overline{m}_V = \begin{pmatrix} \log\left(\frac{\overline{\rho}_{V,1}}{\overline{\rho}_{H,1}} - 1\right) \\ \vdots \\ \log\left(\frac{\overline{\rho}_{V,n}}{\overline{\rho}_{H,n}} - 1\right) \end{pmatrix} \quad (9)$$

Typical settings for vertical resistivity is $\overline{\rho}_{V,k} = 15$ Ohm-meters for all layers k.

Next, the entries of the prior mean vector $\overline{m}$ that pertain to the thicknesses of the layered model are defined as follows:

$$\overline{m}_\tau = \begin{pmatrix} \log(\overline{\tau}_1) \\ \vdots \\ \log(\overline{\tau}_{n-1}) \end{pmatrix} \quad (10)$$

Typical settings for $\overline{\tau}_k$ are given by:

$$\overline{\tau}_k = \frac{\text{total model thickness}}{\text{number of layers}} \quad (11)$$

where 'total model thickness' refers to twice the expected depth of investigation of the measurement device and is typically the length of the longest coil spacing of the measurement device.

Finally, the entries of the prior mean vector $\overline{m}$ that pertain to the dip parameter α is typically set as the inclination $\overline{\alpha}$ of the tool relative to the surface of the earth and is supplied by the while-drilling measurements.

Thus, the prior mean vector $\overline{m}$ of the layered model is then described by $$\overline{m} = \begin{pmatrix} \overline{m}_H \\ \overline{m}_V \\ \overline{m}_\tau \\ \overline{\alpha} \end{pmatrix} \quad (12)$$

The prior covariance matrix $\overline{C}$ is a diagonal matrix whose entries are given by the prior variances for the model parameters. These prior variances describe the range of physically reasonable values for resistivity, layer thickness, and dip. The entries of the prior covariance matrix $\overline{C}$ are described below starting from upper left and continuing to lower right. The first (upper left) block of entries are the variances of the horizontal resistivity parameters given in Equation 2, $\overline{\sigma}_{H,k}^2$, where $\overline{\sigma}_{H,k}=2.0$ for all k. The next block of entries correspond to the variances of the log ratio of vertical to horizontal resistivity as described in Equation 3, $\overline{\sigma}_{V,k}^2$, where $\overline{\sigma}_{V,k}=1.5$ for all k. The next block of entries correspond to the variances for the log layer thickness model parameters described in Equation 6 is $\overline{\sigma}_{\tau,k}^2$ where $\overline{\sigma}_{\tau,k}=1.5$ for all k. Finally, the last (lower right) entry is the variance of the dip parameter $\overline{\sigma}_{\alpha}^2$, where $\overline{\sigma}_{\alpha}=20$ for all k.

The prior probability density function $f(m)$ described in Equation 1 is then given by $$f(m) \propto \exp(-(m-\overline{m})^T \overline{C}^{-1}(m-\overline{m})) \quad (13)$$

Lastly, the measurement errors in the layered model are estimated by the difference between the observations $d^{Obs}$ and the data predicted for a given value of the parameter vector m. It is assumed here that these errors are normally distributed and can thus be described by a normal random variable with mean 0 and covariance matrix $C_\epsilon$, which is a diagonal matrix whose entries describe the expected variance in the predicted measurements. Typical settings on the entries of this matrix depend on the type of coil, the spacing of the coil, the frequency of the measurement, etc. With these assumptions about the measurement errors, the likelihood function in Equation 1 appears as $$f(d^{Obs}|\hat{m}_k) \propto \exp(-(d^{Obs}-g(\hat{m}_k))^T C_\epsilon^{-1}(d^{Obs}-g(\hat{m}_k))) \quad (14)$$

With the items (1)-(4) as described above, an implementation of the nonlinear least squares algorithm is given by $$\hat{C}_k = (\overline{C}^{-1} + G_k^T C_\epsilon^{-1} G_k)^{-1}$$

$$\hat{m}_{k+1} = \overline{m} + \hat{C}_k G_k^T C_\epsilon^{-1}(d^{Obs} - d_k^{Pred} + G_k(\hat{m}_k - \overline{m})) \quad (15)$$

When the algorithm converges, the posterior PDF $f(m|d^{Obs})$ of Equation 1 can be approximated by the normal random variable $N(\hat{m},\hat{C})$ with posterior mean $\hat{m}$ and covariance matrix $\hat{C}$ computed during the last iteration of the algorithm. The initial guess for the nonlinear least squares algorithm, $\hat{m}_0$, can be the prior mean $\overline{m}$ or the posterior mean $\hat{m}$ computed during the most recently successful run of the nonlinear least squares algorithm. The use of the posterior mean from the previous measurement station is equivalent to the use of a Kalman filter for converting the posterior model PDF at one measurement station to the PDF at the next measurement station. The Kalman filter is described in Welch et al., "An Introduction to the Kalman Filter," Technical Report TR 95-041, Department of Computer Science, University of North Carolina at Chapel Hill, 2002, available at http://www.cs.unc.edu/welch and herein incorporated by reference in its entirety.

In the preferred embodiment, the least squares algorithm is executed until the predicted measurement errors are relatively small (e.g., less than 1.0) as measured by the following log likelihood function:

$$-\log f(d^{Obs}|\hat{m}_k) = (d^{Obs}-g(\hat{m}_k))^T C_\epsilon^{-1}(d^{Obs}-g(\hat{m}_k)). \quad (16)$$

The least squares algorithm is also halted when it fails to converge (e.g., at the end of 25 iterations and the log likelihood is greater than 100).

Visualizing the Posterior Probability Density Functions a. Histogram of Layered Models To characterize and visualize the uncertainty of the collection of layered models described by the posterior PDF $f(m|d^{Obs})$, the samples from this distribution are overlaid in a two-dimensional histogram. The first step in building the histogram is to collect together samples from $f(m|d^{Obs})$. When the nonlinear least squares algorithm successfully produces a normal PDF $N(\hat{m},\hat{C})$, a large number of samples are collected from $N(\hat{m},\hat{C})$ for the histogram as follows:

$$m_{sample} = \hat{m} + L\omega \quad (17)$$

where L is the Cholesky decomposition of the posterior covariance matrix $\hat{C}$ and $\omega$ is a vector of identically and independently distributed samples from a standard normal random variable.

These samples correspond to a collection of layered models.

The second step in building the histogram is to prepare a histogram matrix H that provides an uncertainty profile of the collection of layered models. In the preferred embodiment, the horizontal axis of the histogram matrix H will describe the horizontal resistivity of the layers, while the vertical axis will describe the true vertical depth of the layers. The relative granularity of the histogram matrix H is dictated by the number of rows and columns in the histogram matrix H, N and M, which are typically 500 and 200 respectively, and by the physical sizes of the histogram axes. The physical bounds of the horizontal axis of the histogram are defined by $\rho_{MIN}$ and $\rho_{MAX}$, which describe the smallest and largest layer resistivities expected to be produced by the sampling process. Typical settings for these parameters are $\rho_{MIN}=0.1$ Ohm-m and $\rho_{MAX}=500$ Ohm-m. The physical bounds of the vertical axis of the histogram is given by histogramHeight, which defines the vertical size of histogram in units of true vertical depth. A typical setting of the histogramHeight is a length greater than twice the total model thickness defined in the previous section.

Coordinates for the individual columns (j) of the histogram are introduced by first defining their physical size by:

$$\Delta\log\rho = \frac{(\log_{10}\rho_{MAX} - \log_{10}\rho_{MIN})}{M-1} \quad (18)$$

and then by defining the horizontal coordinates of the individual histogram grid cells by:

$$\log\rho_j^{LEFT} = \log_{10}\rho_{MIN} + (j-1)\Delta\log\rho \quad (19)$$

$$\log\rho_j^{RIGHT} = \log_{10}\rho_{MIN} + (j)\Delta\log\rho \quad (20)$$

Coordinates for the individual rows (i) of the histogram are introduced by first defining their physical size $\Delta d$ by:

$$\Delta d = \frac{histogramHeight}{N-1} \quad (21)$$

and then by defining the vertical coordinates of the individual histogram grid cells by:

$$d_i^{TOP} = tvd(1) + (i-1)\Delta d \quad (22)$$

$$d_i^{BTM} = tvd(1) + (i)\Delta d \quad (23)$$

where tvd(1) is the true vertical depth of the tool at the first measurement station, i is an integer ranging from $(c_l-N/2+1)$ to $(c_l+N/2)$, and $c_l$ is the index of the histogram cell associated with the true vertical depth of the current measurement station (tvd(l)) which is given by $$c_l = centerPixel(l) = \left\lceil \frac{tvd(l) - tvd(1)}{\Delta d} \right\rceil + 1 \qquad (24)$$

Construction of the histogram matrix H then proceeds as follows. For each layered model in the collection, the horizontal resistivity $\rho_H$ of the layered model is computed in each depth interval $[d_i^{TOP}, d_i^{BTM}]$ for $i=c_l-N/2+1, \ldots c_l+N/2$. Then the column index j corresponding to $\rho_H$ is determined and the corresponding entry of the histogram incremented. H can then be pictured as a grayscale intensity image as in the left panel of the display window of FIG. 3A. This procedure is represented by the following pseudocode,

```
// psuedocode for constructing resistivity histogram H of layered models
for modelID = 1:nModelSamples
    for layerID = 1:nLayers
        // compute range of rows corresponding to this layer
```

$$topRowRelativeIndex = \left\lceil \frac{bdyDepth(layerID) - tvd(1)}{\Delta d} \right\rceil + 1;$$

topRowindex = topRowRelativeIndex − $c_l$ + N/2;

$$btmRowRelativeIndex = \left\lceil \frac{bdyDepth(layerID + 1) - tvd(1)}{\Delta d} \right\rceil + 1;$$

btmRowindex = btmRowRelativeIndex − $c_l$ + N/2;
// compute index of column corresponding to horizontal resistivity of the layer $$columnIndex = \left\lceil \frac{\log_{10}(layerResistivityH[layerID]) - \log_{10}\rho_{MIN}}{\Delta \log \rho} \right\rceil + 1;$$

```
        // increment entries of H
        H(topRowIndex:btmRowIndex, columnIndex) + = 1;
    end
end
```

A set of vertical contour curves are computed for the histogram matrix H. In the preferred embodiment as illustrated in the left panels of the display windows of FIGS. 3A and 3B, five vertical contour curves (5, 25, 50, 75, and 95%—three blue and two red) are computed as follows. In each row i of the histogram matrix H, the sum $S_i$ of the entries in the $i^{th}$ row of H are computed. To compute the 5% contour curve, compute $0.05 * S_i$, then compute the first column j of the $i^{th}$ row where the sum of the first j entries of the $i^{th}$ row of H exceeds $0.05 * S_i$. Repeating this procedure for each row i will identify a vertical curve describing the 5% contour. Similar procedures can produce the other four contour curves of the preferred embodiment. This process is summarized by the following psuedocode.

```
// psuedocode for computing the histogram contour curves
for i=1:N // indexes the rows of the histogram H
    S_i = sum of entries in ith row of histogram H
    this_col_sum = 0.0;
    last_col_sum = 0.0;
    for j = 1:M // j indexes the columns and M is the number of columns
        logResistivity (j) = log_10 ρ_MIN + (j) Δ log ρ;// log resistivity of jth
        column
        this_col_sum = this_col_sum + H(i,j)
```

-continued

```
        if and(this_col_sum > 0.05 * S_i, last_col_sum <= 0.05 * S_i)
            5PercentIndex (i) = j;
            5PercentCurve (i) = logResistivity (j);
        end
        if and(this_col_sum > 0.5 * S_i, last_col_sum <= 0.5 * S_i)
            50PercentIndex (i) = j;
            50PercentCurve (i) = logResistivity (j);
        end
        if and(this_col_sum > 0.95 * S_i, last_col_sum <= 0.95 * S_i)
            95PercentIndex (i) = j;
            95PercentCurve (i) = logResistivity (j);
        end
        // similar code for the 25 and 75% curves
        last_col_sum = this_col_sum;
    end
```

$$uncertaintyCurve(i) = \frac{95PercentCurve\ (i) - 5\ PercentCurve\ (i)}{2.0}$$

end b. Encoding Formation Resistivity Predictions and Corresponding Uncertainty Using a Variably Saturated Colormap The uncertainty profile of the collection of model layers is summarized by the one or more of the vertical contour curves of the set. In the preferred embodiment as illustrated in the right panels of FIGS. 3A and 3B, the 50% contour curve (denoted 50 PercentCurve(i)) and an uncertainty width curve (which is defined as the half the difference between the 95 and 5 percent contour curves) are encoded using the colormap and placed into the curtain plot. The colormap utilizes the 50% contour value and the uncertainty width value to determine a corresponding color hue and saturation level.

In the preferred embodiment, the colormap (denoted C) is a P by M array where M is the number of columns in the 2D layered model histogram H and P is the number of rows in the array that will used to index the log-resistivity uncertainty (typically 64 or 128). Each entry of the array stores a 3-tuple in accordance with the well known HSV color space consisting of a hue value, a saturation value, and brightness value. In the HSV color space, as hue varies from 0 to 1.0, the corresponding colors vary from red through yellow, green, cyan, blue, magenta, and back to red, so that there are actually red values both at 0 and 1.0. As saturation varies from 0 to 1.0, the corresponding hues vary from unsaturated (shades of gray) to fully saturated (no white component). As value, or brightness, varies from 0 to 1.0, the corresponding colors become increasingly brighter. FIG. 5 illustrates the HSV color space. Note that the brightness values for the entries of the colormap array may be omitted as it is assumed a constant 1.0 over the entries of the array. FIG. 4 illustrates an image of an exemplary colormap employing the HSV color space wherein the saturation values C(i, j,2) of the entries of the array are computed as $$C(i, j, 2) = 1.0 - \frac{j-1}{P-1}$$

and the hue values C(i, j,1) of the entries of the array are computed as $$C(i, j, 1) = \frac{2(i-1)}{3(M-1)}.$$

The brightness values $C(i, j, 3)$ of the entries of the array are constant $C(i,j,3)=1.0$. In this exemplary colormap, decreasing the saturation increases the white component of the color and thus leads to a colormap that gradually becomes completely unsaturated and entirely white.

The columns of the colormap array are indexed with the same coordinates as was the histogram matrix H of the layered model's log-resistivity, i.e. using log $\rho_j^{LEFT}$ and log $\rho_j^{RIGHT}$ of Equations 19 and 20. The minimum and maximum uncertainty width values for the P rows of the colormap array are computed by $$uncertainty_{MIN} = 0.0 \quad (25)$$

$$uncertainty_{MAX} = \frac{(\log_{10}\rho_{MAX} - \log_{10}\rho_{MIN})}{2.0} \quad (26)$$

and the individual rows of the colormap array have a physical size given by $$\Delta_{uncertainty} = \frac{uncertainty_{MAX} - uncertainty_{MIN}}{P - 1} \quad (27)$$

such that rows of the array are indexed with the coordinates given by $$u_i^{MIN} = uncertainty_{MIN} + (i-1)*\Delta_{uncertainty} \quad (28)$$

and $$u_i^{MAX} = uncertainty_{MIN} + (i)*\Delta_{uncertainty} \quad (29)$$

The 50% contour vector and the uncertainty width vector are encoded for the $I^{th}$ column of the curtain plot by using the 50% contour (50 PercentIndex) curve to index the first coordinate of the colormap C and the uncertainty width contour (uncertaintyCurve) to index the saturation coordinate of the colormap C in accordance with the psuedocode below.

```
// psuedocode for assigning a HSV color value for mean resistivity and
uncertainty values
for i = 1:N // indexes the rows of the histogram image H
    hueIndex = 50PercentIndex (i);
    saturationIndex = ⌊(uncertaintyCurve(i_relative) − uncertainty_MIN) / Δ_uncertainty⌋ + 1;
    curtainPlotCompacted (i, l, 1) = C (hueIndex, saturationIndex, 1);
    curtainPlotCompacted (i, l, 2) = C (hueIndex, saturationIndex, 2);
    curtainPlotCompacted (i, l, 3) = C (hueIndex, saturationIndex, 3);
end
```

The result is an N by 3 array of hue/saturation/brightness values assigned by the colormap C, which summarizes the posterior profile of resistivity above and below the measurement device at the current measurement station. The new column is preferably added as the most recent column (I) to the curtain plot as described below.

c. Curtain Plot Construction and Display

The curtain plot display is constructed using an array denoted "curtainPlotCompacted" and is meant to summarize the information extracted from the posterior resistivity uncertainty profiles computed at the most recent measurement stations. Preferably, the user specifies the dimensions of the curtain plot display array, curtainPlot, using the variables windowWidth and windowHeight. The variable windowHeight is preferably N, which is the number of rows in the resistivity uncertainty profile display. This enables the histogram image of the layered models and the curtain plot to be displayed side-by-side in the same display window as shown in FIGS. 3A and 3B. Preferably, the variable windowWidth is selected by the user and varies between 50 and 500 or more depending on application.

Constructing the curtain plot display requires placing the columns of the curtainPlotCompacted array into the appropriate set of rows in the curtainPlot array according to the true vertical depth of the corresponding measurement stations. The vertical placement of these columns is determined by the entries of the centerPixel vector in Equation 24 above. Typically the column computed from the most recent measurement station is centered in the last column of the curtain plot array and the remaining columns are placed relative to the last column's vertical position as described in the pseudocode below.

```
// psuedocode for constructing curtain plot display from collection of
layered
// model mean and uncertainty information from the most
recent measurement stations
// curtainPlot array is windowWidth by windowHeight by 3 in size
for k = 1 − windowWidth: 1
    // the center pixel for the most recent column, l, is assigned to
    // the (windowHeight/2)-nd row of the array curtainPlot
    cpRow = curtainPlotRowForColumnK = c_k − c_l + windowHeight/2;
    curtainPlot(cpRow − N/2 + 1:cpRow + N/2, k, 1:3) =
    curtainPlotCompacted(1:N, k, 1:3);
end
```

Note the color values used for displaying the curtain plot are typically defined in an RGB color space. In this case, the hue, saturation and brightness values that specify the colors for the new column of the curtain plot in the HSV color space may be converted into corresponding RGB values as is well known in the art. Alternatively, other suitable color transformations may be used as required.

d. Dip Histogram Display

Figure 6:
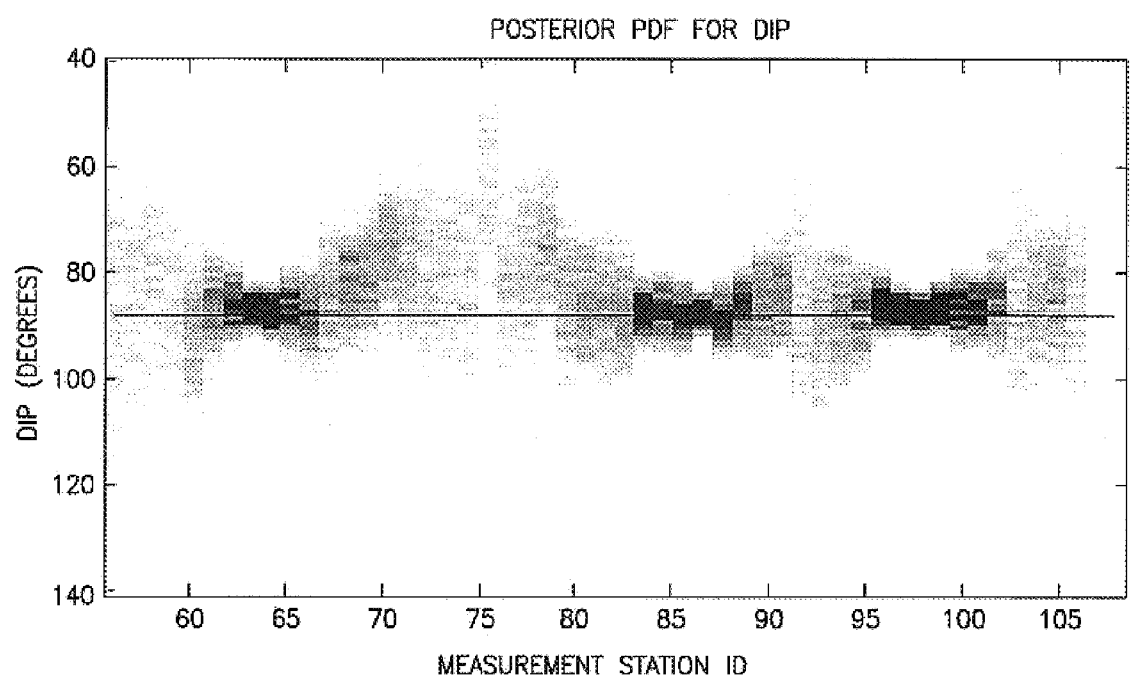
FIG. 6 is an image displaying a profile of the formation dip parameter $\alpha$ over a set of measurement stations.

The sampling of the collection of layered model as described above (e.g., the sampling of Equation 17) includes samples of the relative dip parameter α. These samples can be collected into a histogram denoted "dipHistogram". An image of the dipHistogram can be displayed to the user so that one can observe the constraints placed upon the relative dip parameter α by the measurements at successive measurement stations. An image of an exemplary dipHistogram is shown in FIG. 6.

The number of rows in dipHistogram is nDip which is typically 100, and the columns are indexed by the measurement stations. The physical bounds for the vertical axis of dipHistogram are [dipMin, dipMax], and typical settings are 40 and 140 degrees when drilling a deviated well. The following pseudo code implements the construction of the most recent column of the dipHistogram display, e.g. the $l^{th}$ column.

```
// psuedo code for constructing the lth column of the dipHistogram display
// dipHistogram has nDip rows.
// the physical dimensions of the vertical axis of the dipHistogram display
is [dipMin, dipMax]

Δdip = maxDip - minDip / nDip - 1;
    // the vertical size of the pixels in dipHistogram // the horizontal axis of the dipHistogram display is measurement station
index for modelID = 1:nModelSamples
    rowIndex = ⌊ (dipSample(modelID) - minDip) / Δdip ⌋ + 1;

dipHistogram (rowIndex, l) + = 1;
end
``` e. Use of the Formation Dip to Make a Prediction of the Resistivity Ahead of the Bit.

Figure 7:
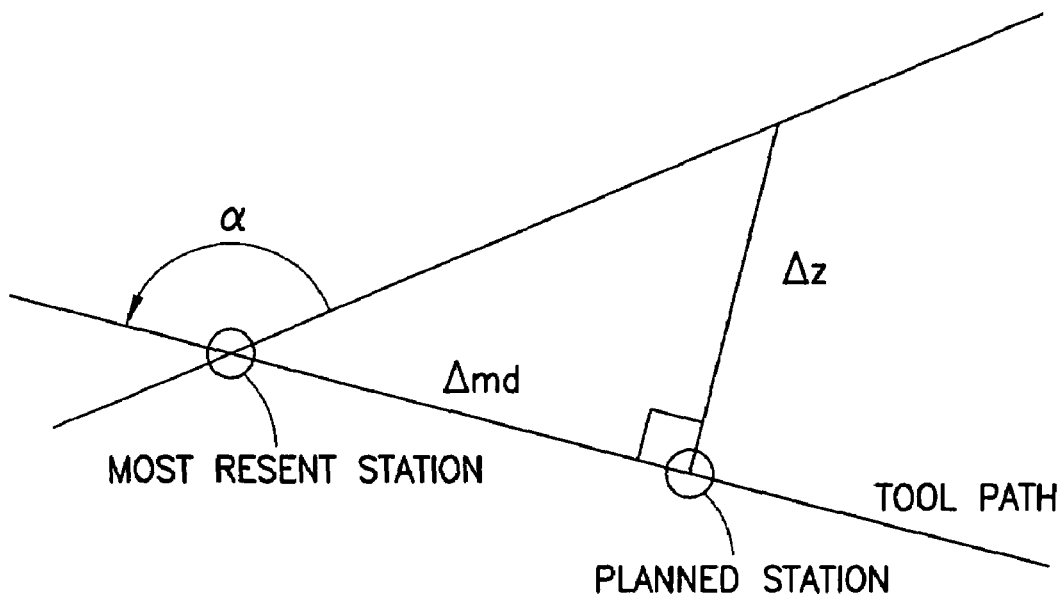
FIG. 7 is a pictorial illustration of the formation dip model parameter $\alpha$ and the geometry of interpolating current histogram of formation resistivity from one measurement station to another.

The sample of the relative dip parameter a at the most recent measurement station can be used to predict the distribution of formation resistivity properties at future measurement stations. The relationship between the relative formation dip α and the tool trajectory is illustrated in FIG. 7. The relative vertical offset between the tool trajectory and the formation at the planned measurement station is Δz and can be computed with $$\Delta z = (\Delta md)\tan(\pi - \alpha) \quad (30)$$

where Δmd is the change in measured depth between the measurement stations.

Given the pixel size for the vertical axis in the curtain plot, Δd from Equation 21, the number of vertical pixels that the new column of the curtain plot should be offset to agree with the relative dip parameter α is $$\Delta pixels = \left\lfloor \frac{\Delta z}{\Delta d} \right\rfloor \quad (31)$$

The most recent column of the curtain plot can then be extracted into the columns for planned measurement stations as follows:

```
// pseudo code for extrapolating most recent column of curtain plot to planned
// measurement stations using the posterior estimate for dip α at the most recent station
Δz = (Δmd) tan (π - α)
for k = l + 1:l + n
    pixelShift = ⌊ (k-l) * Δz / Δd ⌋;

cpRow = curtainPlotRowForColumnK = c_k - c_l + windowHeight/2 + pixelShift;
    curtainPlot(cpRow - N/2 + 1 : cpRow + N/2, k) =
        curtainPlotCompacted(1 : N, l);
end
```

Extensions a. Monte Carlo Sampling

The method described above for computing the posterior profile of layered resistivity models could be implemented using a Monte Carlo sampling of formation models instead using the nonlinear least squares algorithm. The nonlinear least squares algorithm is used primarily for computation convenience, as running the forward model that maps model values to predicted measurements many times is not computationally feasible for some real-time drilling scenarios.

When using Monte Carlo sampling, it may be helpful to use a more compact parameterization in order to reduce the computational burden of the Monte Carlo sampling procedure. An example of such a compact parameterization employs a general anisotropy parameter a as a substitute for vertical resistivity as follows:

$$m = \begin{pmatrix} m_H \\ m_a \\ m_\tau \\ \alpha \end{pmatrix} \quad (32)$$

For this alternate model parameterization, the entries of the prior mean vector $\overline{m}$ that pertain to the general anisotropy parameter a of the layered model are defined as follows:

$$\overline{m}_a = \log(\overline{a} - 1) \quad (33)$$

Typical settings for the anisotropy parameter $\overline{a}=1.5$ for all layers k. The prior variance for log anisotropy $\overline{\sigma}_a^2$ has $\overline{\sigma}_a = 1.5$.

Many different Monte Carlo algorithms can be used. For example, a Markov Chain Monte Carlo (MCMC) algorithm can be used to sample the posterior distribution $f(m|d^{Obs})$ directly. MCMC algorithms are well known in the art. For example, MCMC algorithms are described in Sen et al. "Global optimization methods in Geophysical Inversion," Elsevier, Amsterdam, 1995, herein incorporated by reference in its entirety.

One possible implementation could be a simple rejection sampling of formation models as described in Press et al. "Numerical Recipes in C: The Art of Scientific Computing," Cambridge University Press, New York, $2^{nd}$ Edition, 1992, Section 7.3, herein incorporated by reference in its entirety. Another possible implementation is based on a technique described in Malinverno et al., "Bayesian Inversion of DC electrical measurements with uncertainties for reservoir monitoring", Inverse Problems, Vol. 16, pp. 1343-1356, 2000, herein incorporated by reference in its entirety. Thus, implementation begins by selecting a seed sample from the prior PDF described in Equation 13 or with a sample from the normal random variable $N(\hat{m}, \hat{C})$ computed during the most recently successful run of the nonlinear least squares algorithm. During the sampling process, the current value of the model parameter vector m is modified at random to obtain a candidate model vector m'. This candidate is drawn from a proposal probability density function (PDF) q(m'|m). This proposal PDF can either be the prior PDF $$q(m'|m) \propto N(\overline{m}, \overline{C}) \quad (34)$$

or the proposal PDF could be the posterior PDF computed during the most recently successful run of the nonlinear least squares algorithm.

$$q(m'|m) \propto N(m', \hat{C}) \quad (35)$$

This candidate m' is accepted with an acceptance probability given by $$prob_{acceptance} = \min\left[1, \frac{f(m'|d^{Obs})q(m|m')}{f(m|d^{Obs})q(m'|m)}\right] \quad (36)$$

where $f(m|d^{Obs})$ is computed directly using Equations 1, 13, and 14 as $$-\log f(m|d^{Obs}) = (m-\overline{m})^T \overline{C}^{-1}(m-\overline{m}) + (d^{Obs} - g(\hat{m}_k))^T C_\epsilon^{-1}(d^{Obs} - g(\hat{m}_k)) \quad (37)$$

At each step in the sampling procedure, the most recently accepted model parameter is collected. This collection of samples effectively samples the posterior distribution $f(m|d^{Obs})$. In the preferred implementation, the sampling process is started 10 times and run for 100 iterations each.

b. Choice of the Number of Layers in Model

In the preferred embodiment, the number of layers, n, in the model parameterization is a free parameter set by the user or as a default parameter in the software.

Alternatively, the number of layers in the model parameterization may vary between measurement stations. At each measurement station, one could produce a spatial histogram of the formation resistivity and corresponding column for the curtain plot for the particular choice of number of layers. In this example, the number of layers on the model parameterization at a given measurement station may be determined using the marginal likelihood as follows $$-\log P(n|d^{Obs}) = -\log \det \hat{C} + \log \det \overline{C} - 0.5(\hat{m}-\overline{m})^T \overline{C}^{-1}(\hat{m}-\overline{m}) - 0.5(d^{Obs} - g(\hat{m}))^T C_\epsilon^{-1}(d^{Obs} - g(\hat{m})) \quad (39)$$

Such marginal likelihood analysis is described in detail in Malinverno et al. "Expanded uncertainty quantification in inverse problems: Hierarchical Bayes and Empirical Bayes," Geophys. Soc. of Expl. Geophys., Vol. 69, pp. 1005-1016, 2004, which is incorporated herein by reference in its entirety.

Figure 8:
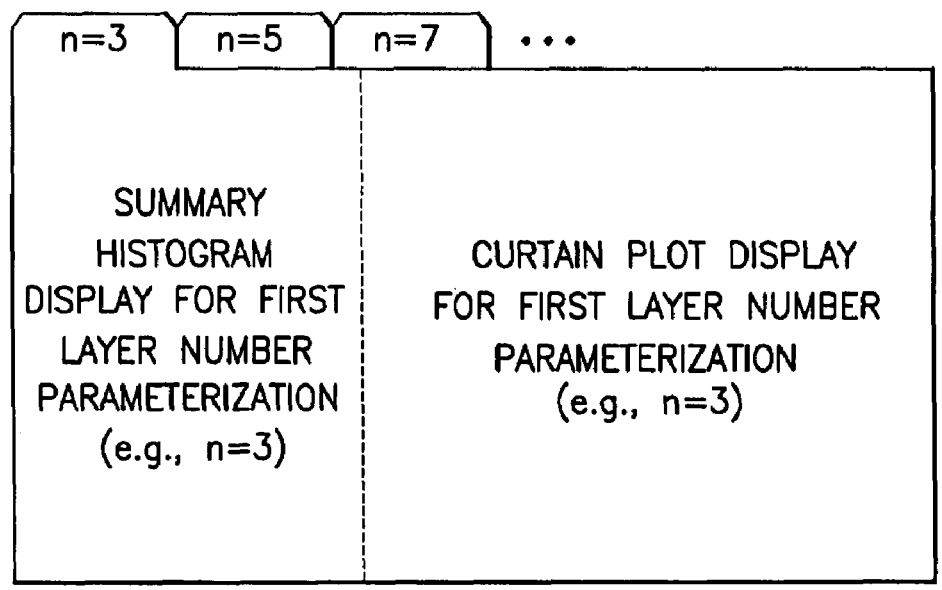
FIG. 8 is a schematic illustration of a tabbed windowing scheme for displaying a set of curtain plot displays of varying layer number parameterizations.

In yet another alternative methodology, the display window of FIGS. 3A and 3B may be presented in a tabbed fashion as depicted in FIG. 8. In this tabbed display scheme, the tabs show the result of the processing for different layer number parameterizations (e.g., tabs for 3, 5, 7 layers and possibly a tab for the optimum number of layers). This would allow the use to have a better understanding of the role that the number of layers has on the spatial histogram and curtain plot displays.

Alternatively, a reversible jump Markov Chain Monte Carlo technique can be used to compute a posterior profile of resistivity that accounts for the uncertainty in the choice of the number of layers in the model as described in Malinverno, A., "Parsimonious Bayesian Markov chain Monte Carlo inversion in a nonlinear geophysical problem", Geophys. J. Int., Vol. 151, pp. 675, 2002, herein incorporated by reference in its entirety.

c. Anisotropy Histogram Display

When using the model parameterization described in Equation 32, the sampling of the collection of layered models as described above (e.g. the sampling of Equation 17) includes samples of the formation anisotropy parameter a. These samples can be collected into a histogram denoted "anisotropyHistogram". An image of the histogram can be displayed so as to observe the constraints placed upon the anisotropy parameter by the measurements at successive measurement stations.

The construction of the anisotropyHistogram proceeds in an entirely analogous fashion as the construction of the dipHistogram described above. The number of rows in the anisotropyHistogram could be 100 and the measurement stations would index the columns. The physical bounds of the vertical axis would be [anisotropyMin, anisotropyMax] and typical settings would be 1 and 10. Psuedocode analogous to that described above for the construction for the dipHistogram of FIG. 6 can be used to implement the construction and display of the most recent column of the anisotropyHistogram.

d. Use of Other Logging Measurements and Wireline Applications

The computer-based methodology described herein can also be extended to make use of other while-drilling measurements such as sonic and seismic while-drilling measurements. These applications would require introducing other layer properties such as compressional velocity or acoustic impedance. Spatial histograms similar to those produced for horizontal resistivity displayed in the left hand panel of the display windows of FIGS. 3A and 3B could be produced for these additional properties using samples produced via Equation 17 or from the use of Monte Carlo sampling. Then the corresponding curtain plots for these properties could be produced in the identical way. These curtain plots for the various formation properties could be placed side by side in a new display in order to show the relation between these formation properties and layer positions. The overall probabilistic and display framework would however be largely unchanged.

In addition, the computer-based methodology can be applied to measurements obtained in deviated or horizontal wells using wireline measurements.

There have been described and illustrated herein several embodiments of a computer-based method for while-drilling modeling and visualization of subterranean earth formations. While particular embodiments of the invention have been described, it is not intended that the invention be limited thereto, as it is intended that the invention be as broad in scope as the art will allow and that the specification be read likewise. Thus, while particular model parameters have been disclosed, it will be appreciated that other model parameters can be used as well. In addition, while particular types of inverse model analysis have been disclosed, it will be understood that other types of inverse modeling analysis can be used. Also, while modeling and visualizing formation resistivity is preferred, it will be recognized that other formation properties can be modeled and visualized as well. Furthermore, while particular data structures have been disclosed for the uncertainty histogram and colormap, it will be understood that other data structures can be similarly used. It will therefore be appreciated by those skilled in the art that yet other modifications could be made to the provided invention without deviating from its spirit and scope as claimed.

What is claimed is:

1. A computer-based method for real-time modeling and visualizing a property of a subterranean earth formation while drilling a borehole therethrough comprising:

obtaining a plurality of electromagnetic signals corresponding to a current measurement station location of a measurement-while-drilling tool;

generating a multilayer model corresponding to the plurality of electromagnetic signals;

generating a histogram characterizing uncertainty of the multilayer model over depth values above and below the measurement-while-drilling tool by sampling said multilayer model and overlying samples of said multilayer model;

generating a set of color hue values based upon said histogram, said set of color hue values representing predictions of the property of the earth formation for depth values above and below the measurement-while-drilling tool;

generating a set of saturation values based upon said histogram, said set of saturation values corresponding to said set of color hue values and representing uncertainties for the predictions from which the corresponding color hue values are derived;

generating and displaying a curtain plot whose columns employ colors to depict predictions of the property of the subterranean earth formation for depth values above and below the measurement-while-drilling tool over successive measurement station locations, wherein each column of the curtain plot corresponds to a given measurement station location; and generating a new column of the curtain plot for the current measurement station location, wherein the color values of the new column are based upon the set of color hue values and the set of saturation values derived from said histogram, wherein the saturation levels of the color values of the new column represent uncertainties for the predictions from which the corresponding color values are derived.

2. A method according to claim 1, further comprising: displaying an image including a set of contour curves that summarizes said histogram.

3. A method according to claim 2, wherein: said image and said curtain plot are displayed side-by-side as part of a display window.

4. A computer-based method according to claim 1, wherein: the multilayer model is derived by operation of a nonlinear least squares algorithm.

5. A computer-based method according to claim 4, wherein:
an initial guess for the nonlinear least squares algorithm is one of:
i) a prior mean computed during a most recently successful run of the nonlinear least squares algorithm, and
ii) a posterior mean computed during a most recently successful run of the nonlinear least squares algorithm.

6. A computer-based method according to claim 4, wherein:
the sampling is carried out by at least one of:
i) sampling a posteriori probability density function of the multilayer model, and
ii) Markov Chain Monte Carlo sampling of a posterior distribution of the multilayer model.

7. A computer-based method according to claim 1, wherein: the property comprises resistivity of the earth formation.

8. A computer-based method according to claim 7, wherein:
the multilayer model includes at least one of:
i) a parameter representing horizontal resistivity of the earth formation over N layers of the model;
ii) a parameter representing vertical resistivity of the earth formation over the N layers of the model;
iii) a parameter representing general anisotropy of the earth formation over the N layers of the model;
iv) a parameter representing thickness of the earth formation over the N layers of the model; and
v) a parameter representing the relative dip of the formation with respect to the axis of the measurement-while-drilling tool.

9. A computer-based method according to claim 8, wherein: the number N is greater than 3.

10. A computer-based method according to claim to 1, wherein:
the histogram employs a horizontal axis describing horizontal resistivity and a vertical axis describing vertical depth of layers of said multilayer model;
physical bounds of the horizontal axis of the histogram are defined by $\rho_{MIN}$ and $\rho_{MAX}$, which describe smallest and largest horizontal resistivities expected to be produced by the sampling step;
horizontal coordinates for individual columns of the histogram are defined by computing physical size of the individual columns of the histogram as $$\Delta \log \rho = \frac{(\log_{10} \rho_{MAX} - \log_{10} \rho_{MIN})}{M - 1},$$

and then by defining horizontal coordinates of the individual histogram grid cells as $$\log \rho_j^{LEFT} = \log_{10} \rho_{MIN} + (j-1)\Delta \log \rho,$$

and $$\log \rho_j^{RIGHT} = \log_{10} \rho_{MIN} + (j)\Delta \log \rho;$$

physical bounds of the vertical axis of the histogram are defined by a parameter histogramHeight; and
vertical coordinates for individual rows of the histogram are defined by computing physical size of the individual rows of the histogram as $$\Delta d = \frac{histogramHeight}{N - 1},$$

and then by defining vertical coordinates of the individual histogram grid cells as $$d_i^{TOP} = tvd(1) + (i-1)\Delta d,$$

and $$d_i^{BTM} = tvd(1) + (i)\Delta d,$$

where tvd(1) is a true vertical depth of the tool at a first measurement station, i is an integer ranging from $(c_l - N/2 + 1)$ to $(c_l + N/2)$, and $c_l$ is the index of the histogram cell associated with the true vertical depth of a current measurement station (tvd(l)) which is given by $$c_l = centerPixel(l) = \left[\frac{tvd(l) - tvd(1)}{\Delta d}\right] + 1.$$

11. A computer-based method according to claim 10, wherein:
the histogram is constructed for each layered model in a collection of layered models as follows:

i) computing horizontal resistivity of the layered model in each depth interval $[d_i^{TOP}, d_i^{BTM}]$ for $i=c_l-N/2+1, \ldots c_l+N/2$; and ii) determining a column index j corresponding to each computed horizontal resistivity and incrementing the corresponding entry of the histogram.

12. A computer-based method according to claim 1, wherein:

the set of color hue values are derived from a first contour curve of the histogram; and the set of saturation values are derived from second and third contour curves of the histogram.

13. A computer-based method according to claim 12, wherein:

the set of color hue values are derived from the 50% contour curve of the histogram; and the set of saturation values are derived from the difference between a 95% contour curve and a 5% contour curve of the histogram.

14. A computer-based method according to claim 1, wherein:

the colormap stores an array of entries that specify a color employing HSV color space (hue, saturation, brightness) wherein the saturation values C(i, j, 2) of the entries are computed as $$C(i, j, 2) = 1.0 - \frac{j-1}{P-1},$$

the hue values C(i, j, 1) of the entries are computed as $$C(i, j, 1) = \frac{2(i-1)}{3(M-1)},$$

and the brightness values C(i, j, 3) of the entries are constant C(i, j, 3)=1.0.

15. A computer-based method according to claim 14, wherein:

said colormap employs a horizontal axis describing predicted horizontal resistivity and a vertical axis describing uncertainty, physical bounds of the horizontal axis of the colormap are defined by $\rho_{MIN}$ and $\rho_{MAX}$, which describe smallest and largest horizontal resistivities expected to be produced by the sampling step;

horizontal coordinates for individual columns of the colormap are defined by computing physical size of the individual columns of the colormap as $$\Delta \log \rho = \frac{(\log_{10} \rho_{MAX} - \log_{10} \rho_{MIN})}{M-1},$$

and then by defining horizontal coordinates of the individual colormap grid cells as $\log \rho_j^{LEFT} = \log_{10} \rho_{MIN} + (j-1)\Delta \log \rho,$ and $\log \rho_j^{RIGHT} = \log_{10} \rho_{MIN} + (j)\Delta \log \rho;$ physical bounds of the vertical axis of the colormap are defined as $uncertainty_{MIN} = 0.0,$ and $$uncertainty_{MAX} = \frac{(\log_{10} \rho_{MAX} - \log_{10} \rho_{MIN})}{2.0};$$

vertical coordinates for the individual rows of the colormap are defined by computing physical size of the individual rows of the color map as $$\Delta_{uncertainty} = \frac{uncertainty_{MAX} - uncertainty_{MIN}}{P-1}$$

and then by defining vertical coordinates of the individual colormap grid cells as $u_i^{MIN} = uncertainty_{MIN} + (i-1)*\Delta_{uncertainty},$ and $u_i^{MAX} = uncertainty_{MIN} + (i)*\Delta_{uncertainty}.$ 16. A computer-based method according to claim 1, further comprising:

generating a dip histogram characterizing formation dip predictions over successive measurement station locations; and displaying an image based upon the dip histogram.

17. A computer-based method according to claim 1, further comprising:

generating formation anisotropy predictions over successive measurement stations; and displaying an image based upon the anisotropy histogram.

18. A computer-based method according to claim 1, further comprising:

generating an estimated dip parameter $\alpha$ for the current measurement station location; and employing the estimated dip parameter $\alpha$ and the tool trajectory to predict the spatial distribution of formation resistivity properties at at least one future measurement station location.

19. A computer-based method according to claim 1, wherein:

the multilayer model has a number of layers n having at least one of the following properties:

i) n is a free parameter set by the user;

ii) n can vary between measurement station locations; and iii) n is optimized using a marginal likelihood analysis.

20. A computer-based method according to claim 1, further comprising:

generating a plurality of curtain plots each having a different layer number parameterization for a multilayer model from which it is derived.

21. A computer-based method according to claim 20, further comprising:

displaying said plurality of curtain plots in different display windows.

22. A computer-based method according to claim 21, wherein:
   said different display windows are presented in a tabbed fashion.

23. A computer-based method according to claim 1, wherein:
   the electromagnetic signals are obtained in real-time from a directional electromagnetic measurement-while-drilling tool which is capable of distinguishing the formation properties above and below the tool location.

24. A computer-based method according to claim 1, wherein:
   the multilayer model corresponds to other while-drilling measurements.

25. A computer-based method according to claim 24, wherein:
   the other while-drilling measurements comprise at least one of sonic-type and seismic-type while-drilling measurements.

* * * * *